(12) United States Patent  
Yukimatsu

(10) Patent No.: US 9,241,145 B2
(45) Date of Patent: *Jan. 19, 2016

(54) INFORMATION PROCESSING SYSTEM, RECORDING/PLAYBACK APPARATUS, PLAYBACK TERMINAL, INFORMATION PROCESSING METHOD, AND PROGRAM

(71) Applicant: Sony Corporation, Tokyo (JP)

(72) Inventor: Yosuke Yukimatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 14/067,311

(22) Filed: Oct. 30, 2013

(65) Prior Publication Data

US 2014/0050457 A1 Feb. 20, 2014

Related U.S. Application Data

(63) Continuation of application No. 11/750,621, filed on May 18, 2007, now Pat. No. 8,625,961.

(30) Foreign Application Priority Data

Jun. 9, 2006 (JP) .................................. 2006-161084

(51) Int. Cl.
*H04N 9/80* (2006.01)
*H04N 5/765* (2006.01)
*H04N 5/93* (2006.01)
*H04N 9/87* (2006.01)
*G11B 27/10* (2006.01)
(Continued)

(52) U.S. Cl.
CPC ................ *H04N 9/87* (2013.01); *G11B 27/105* (2013.01); *G11B 27/322* (2013.01); *G11B 27/34* (2013.01); *H04N 5/765* (2013.01); *G11B 2220/17* (2013.01); *H04N 5/781* (2013.01); *H04N 5/85* (2013.01); *H04N 5/91* (2013.01); *H04N 9/8205* (2013.01)

(58) Field of Classification Search
USPC ......... 386/200, 201, 216, 219, 230, 232, 239, 386/241, 353, 328
See application file for complete search history.

(56) References Cited

U.S. PATENT DOCUMENTS 7,578,429 B2   8/2009   Nagatsuka et al.
8,112,718 B2   2/2012   Nezu et al.
(Continued)

FOREIGN PATENT DOCUMENTS

JP     2002-262220    9/2002
JP     2004-72132     3/2004
(Continued)

OTHER PUBLICATIONS

Japanese Office Action issued Dec. 2, 2010, in Patent Application No. 2006-161084.

(Continued)

*Primary Examiner* — Hung Dang
(74) *Attorney, Agent, or Firm* — Oblon, McClelland, Maier & Neustadt, L.L.P.

(57) ABSTRACT

An information processing system is disclosed. The information processing system includes: a recording/playback apparatus; and a playback terminal. The recording/playback apparatus includes an output unit, a management unit, and a playback unit. The playback terminal includes a playback unit, a generating unit, and an output unit.

20 Claims, 8 Drawing Sheets

(51) Int. Cl.
*G11B 27/32* (2006.01)
*G11B 27/34* (2006.01)
*H04N 5/781* (2006.01)
*H04N 5/85* (2006.01)
*H04N 5/91* (2006.01)
*H04N 9/82* (2006.01)

(56) References Cited

U.S. PATENT DOCUMENTS

| | | |
|---|---|---|
| 2003/0086691 A1 | 5/2003 | Yu |
| 2004/0008970 A1 | 1/2004 | Junkersfeld et al. |
| 2004/0221308 A1 | 11/2004 | Cuttner et al. |
| 2005/0044489 A1 | 2/2005 | Yamagami et al. |
| 2005/0114214 A1 | 5/2005 | Itoh |
| 2005/0169610 A1 | 8/2005 | Ono |
| 2005/0207727 A1 | 9/2005 | Hirose et al. |
| 2005/0229223 A1 | 10/2005 | Katagishi et al. |
| 2005/0245233 A1 | 11/2005 | Anderson |
| 2005/0281540 A1 | 12/2005 | Inokuchi et al. |
| 2006/0085367 A1 | 4/2006 | Genovese |
| 2006/0159429 A1 | 7/2006 | Sugahara et al. |
| 2007/0166005 A1* | 7/2007 | Berstis et al. .......... 386/95 |

FOREIGN PATENT DOCUMENTS

| | | |
|---|---|---|
| JP | 2004-229035 | 8/2004 |
| JP | 2004-350092 | 12/2004 |
| JP | 2005-151445 | 6/2005 |
| JP | 2005-175715 | 6/2005 |
| JP | 2005-184180 | 7/2005 |
| JP | 2005-251374 | 9/2005 |
| JP | 2005-286855 | 10/2005 |
| JP | 2006-199996 | 8/2006 |
| WO | WO 2004/112036 A1 | 12/2004 |

OTHER PUBLICATIONS

Office Action issued Aug. 23, 2011, in Japanese Patent Application No. 2006-161084, filed Jun. 9, 2006.
Office Action issued Jun. 19, 2012, in Japanese Patent Application No. 2006-161084, filed Jun. 9, 2006.

* cited by examiner

INFORMATION PROCESSING SYSTEM, RECORDING/PLAYBACK APPARATUS, PLAYBACK TERMINAL, INFORMATION PROCESSING METHOD, AND PROGRAM

CROSS REFERENCE TO RELATED APPLICATIONS

The present invention is a continuation application of U.S. application Ser. No. 11/750,621, filed May 18, 2007, which contains subject matter related to Japanese Patent Application JP 2006-161084 filed in the Japanese Patent Office on Jun. 9, 2006, the entire contents of both of which are incorporated herein by reference.

BACKGROUND OF THE INVENTION

1. Field of the Invention

The invention relates to an information processing system, a recording/playback apparatus, a playback terminal, an information processing method and a program, particularly, relates to the information processing system, the recording/playback apparatus, the playback terminal, the information processing method and the program, in which a position of a content from which playback is started by the recording/playback device can be selected by a user by referring positions designated by the playback terminal.

2. Background Art

In recent years, concerning a recorder which records video contents such as broadcast programs, the ones using nonvolatile memories having high capacity such as an HDD (Hard Disc Drive) and a DVD (Digital Versatile Disc) prevail, which enables recording of many video contents. It is anticipated that the number of video contents which can be recorded in the recorder continues to increase by the increase of capacity of the HDD and commercialization of optical discs having high capacity.

Additionally, as multi-channel broadcasting is introduced in recent years, multi-content delivery is proceeding. In addition to previous terrestrial analog broadcasting, CS (Communications Satellite) digital broadcasting, BS (Broadcasting Satellite) digital broadcasting, and terrestrial digital broadcasting are started, which increases the number of video contents which can be seen by viewers.

Accordingly, it is presumable that, as the recorder in the future, the recorder complying with the multi-channel broadcasting will prevail. In view of that, it is presumable that many viewers perform recording for the moment and select video contents to be actually viewed among the recorded contents.

Viewing style in which video contents recorded in the recorder are viewed by a portable terminal is prevailing, based on technical background such as improvement of processing power of the CPU (Central Processing Unit) in the potable terminals represented by a cellular phone, high capacity in a memory card removable from the portable terminal, and high capacity in a nonvolatile memory mounted on the portable terminal, as well as environmental changes such as increase of prerecorded video contents.

In JP-A-2002-262220 (Patent Document 1), a technique is disclosed, in which a video content is transmitted to a portable information apparatus after the content is converted into a file for the portable playback device in a recording/playback apparatus connected to the portable playback device.

SUMMARY OF THE INVENTION

However, the viewing style of video contents using the portable terminal is not always excellent in the following points.

1. Since it is necessary to compress data of video contents, picture quality is low.
2. On the nature of the portable terminal as a device, the size of a display used for viewing is small.
3. Viewing in trains or at the outdoor is anticipated, therefore there is a case that a noise problem exist.

Consequently, it is conceivable that there a request that at least main scenes of the video content viewed by using the portable terminal are viewed by using a device at home having good viewing environment, however, in the technique at present, it is necessary that playback is started from the head of the video content and desired positions to be viewed are searched by performing fast-forwarding operation or rewinding operation despite it is the same video content as the one viewed by using the portable terminal.

It is desirable to allow the user to select positions of the content from which playback is started by the recording/playback apparatus by referring positions designated by the playback terminal.

An information processing system according to an embodiment of the invention includes a recording/playback apparatus and a playback terminal. The recording/playback apparatus as one of them has an output unit outputting a content to the playback terminal, a management unit managing a list in which plural information including position information indicating positions designated by a user of the playback terminal during playback of the content and identification information of the user of the playback terminal, which are outputted from the playback terminal, and a playback unit presenting specific information at respective positions indicated by the position information included in information including the same identification information as identification information designated by the user among information registered in the list, and playing back the content from a selected position, and the playback terminal has a playback unit playing back a content outputted from the recording/playback apparatus, a generating unit generating information including position information indicating positions in the content designated by the user during playback of the content and identification information of the user, and registering the information in the list, and an output unit outputting the list in which plural information generated by the generating unit is registered to the recording/playback apparatus.

A recording/playback apparatus according to an embodiment of the invention includes an output unit outputting a content to the playback terminal, a management unit managing a list in which plural information including position information indicating positions designated by a user of the playback terminal during playback of the content and identification information of the user of the playback terminal, which are outputted from the playback terminal, and a playback unit presenting specific information of the content at respective positions indicated by the position information included in information including the same identification information as identification information designated by the user among information registered in the list, and playing back the content from a selected position.

The playback unit can present at least images of the content and time information at respective positions as the specific information.

In the case that comments inputted by the user of the playback terminal when designating positions of the content are included in information registered in the list, the playback unit can further represent the comments as the specific information in addition to images of the content and time information at respective positions.

An information processing method or a program according to an embodiment of the invention includes the steps of outputting a content to a playback terminal, managing a list in which plural information including position information indicating positions designated by a user of the playback terminal during playback of the content and identification information of the user of the playback terminal, which are outputted from the playback terminal, and presenting specific information of the content at respective positions indicated by the position information included in information including the same identification information as identification information designated by the user among information registered in the list, and playing back the content from a selected position.

A playback terminal according to an embodiment of the invention includes a playback unit playing back a content outputted from a recording/playback apparatus, a generating unit generating information including position information indicating positions in the content designated by the user during playback of the content and identification information of the user, and registering the information in a list, and an output unit outputting the list in which plural information generated by the generating unit is registered to the recording/playback apparatus.

The generating unit, when position registration is instructed during the playback of the content, can present plural positions which are prior to a playback position at the time by predetermined periods of time as positions to be able to be registered, and can generate information including the position information indicating a selected position from the presented positions.

The generating unit can generate information including comments inputted by the user when designating positions of the content.

An information processing method or a program according to an embodiment of the invention includes the steps of playing back a content outputted from a recording/playback apparatus, generating information including position information indicating positions of the content designated by the user during the playback of the content and identification information of the user, and registering the information in a list, and outputting the list in which the generated plural information is registered to the recording/playback apparatus.

In the recording/playback apparatus in the information processing system of the embodiment of the invention, the content is outputted to the playback terminal, and the list is managed, in which plural information including position information indicating positions designated by the user of the playback terminal during playback of the content and the identification information of the user of the playback terminal, which are outputted from the playback terminal. In addition, specific information of the content at respective positions indicated by the position information included in information including the same identification information as identification information designated by the user among information registered in the list is presented, and the content is played back from a selected position.

On the other hand, in the playback terminal, a content outputted from the recording/playback apparatus is played back, information including position information indicating positions in the content designated by the user during playback of the content and identification information of the user is generated and registered in the list. In addition, the list in which the generated plural information is registered is outputted to the recording/playback apparatus.

According to the embodiment of the invention, a content is outputted to a playback terminal, a list in which plural information including position information indicating positions designated by a user of the playback terminal during playback of the content and identification information of the user of the playback terminal, which are outputted from the playback terminal is managed. In addition, specific information of the content at respective positions indicated by the position information included in information including the same identification information as identification information designated by the user among information registered in the list is presented, and the content is played back from a selected position.

According to the embodiment of the invention, a content outputted from a recording/playback apparatus is played back, information including position information indicating positions of the content designated by the user during the playback of the content and identification information of the user is generated and registered in a list. In addition, the list in which the generated plural information is registered is outputted to the recording/playback apparatus.

According to the embodiment of the invention, the user selects a position of the content from which playback is started by the recording/playback apparatus, referring positions designated by using the playback terminal.

DESCRIPTION OF THE PREFERRED EMBODIMENTS

Embodiments of the invention will be described below, and the correspondence between constituent features of the invention and embodiments described in the specification and the drawings is exemplified as follows. The description is made for confirming that embodiments which support the invention are written in the specification and the drawings. Therefore, if there is an embodiment which is written in the specification and the drawings but not written here as the embodiment corresponding to a constituent feature of the invention, that does not mean that the embodiment does not correspond to the constituent feature. Conversely, if an embodiment is written here as the embodiment corresponding to the invention, that does not mean that the embodiment does not correspond to a feature other than the constituent feature.

Figure 1:
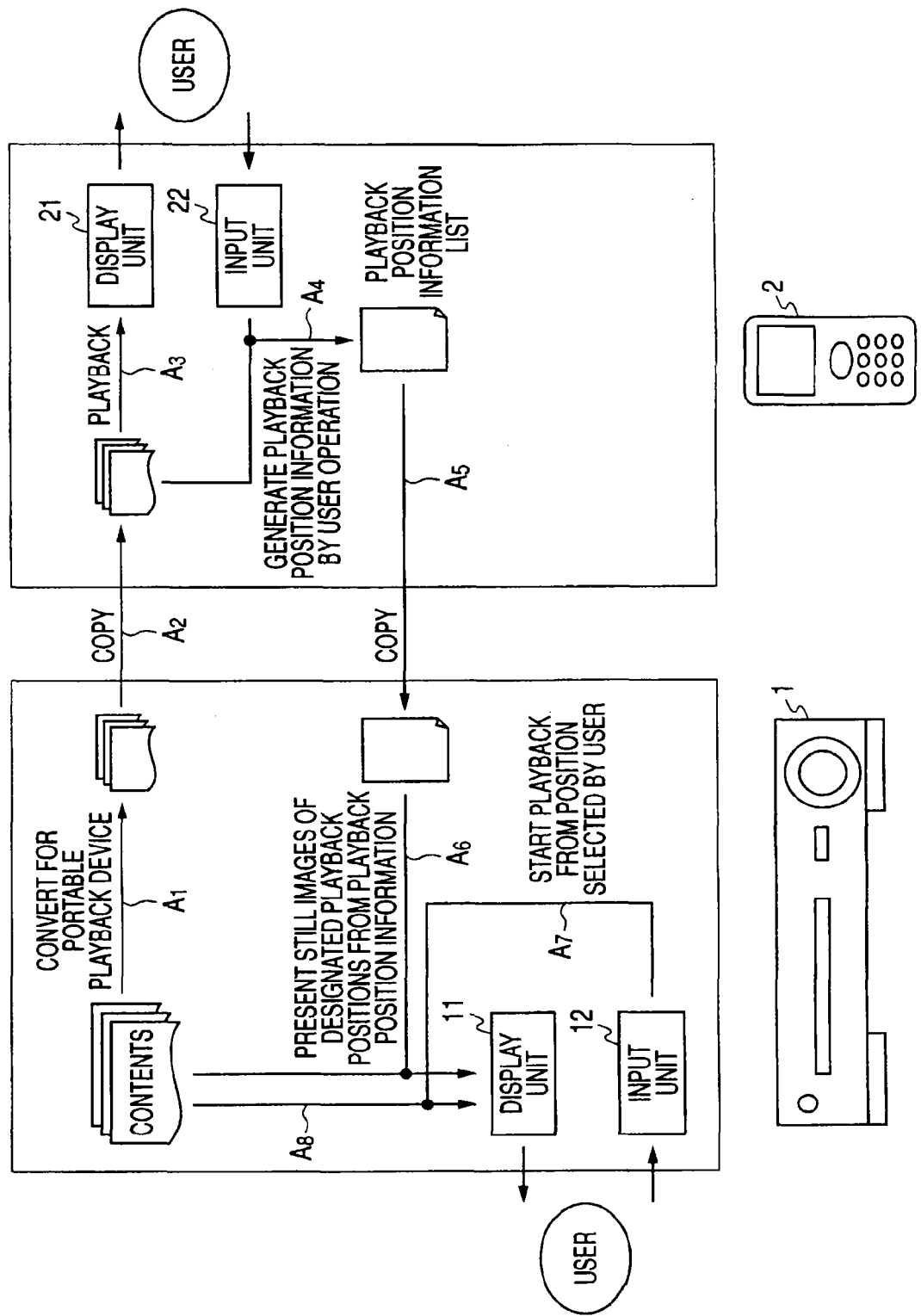
FIG. 1 is a view showing a configuration example of an information processing system according to an embodiment of the invention.

An information processing system according to an embodiment of the invention (for example, an information processing system of FIG. 1) basically includes a configuration of a recording/playback apparatus of the embodiment of the invention (for example, a recording/playback device 1 of FIG. 1) and a configuration of a playback terminal of the embodiment of the invention (for example, a portable playback device 2 of FIG. 1). The correspondence between respective configurations and embodiments will be described as follows.

Figure 4:
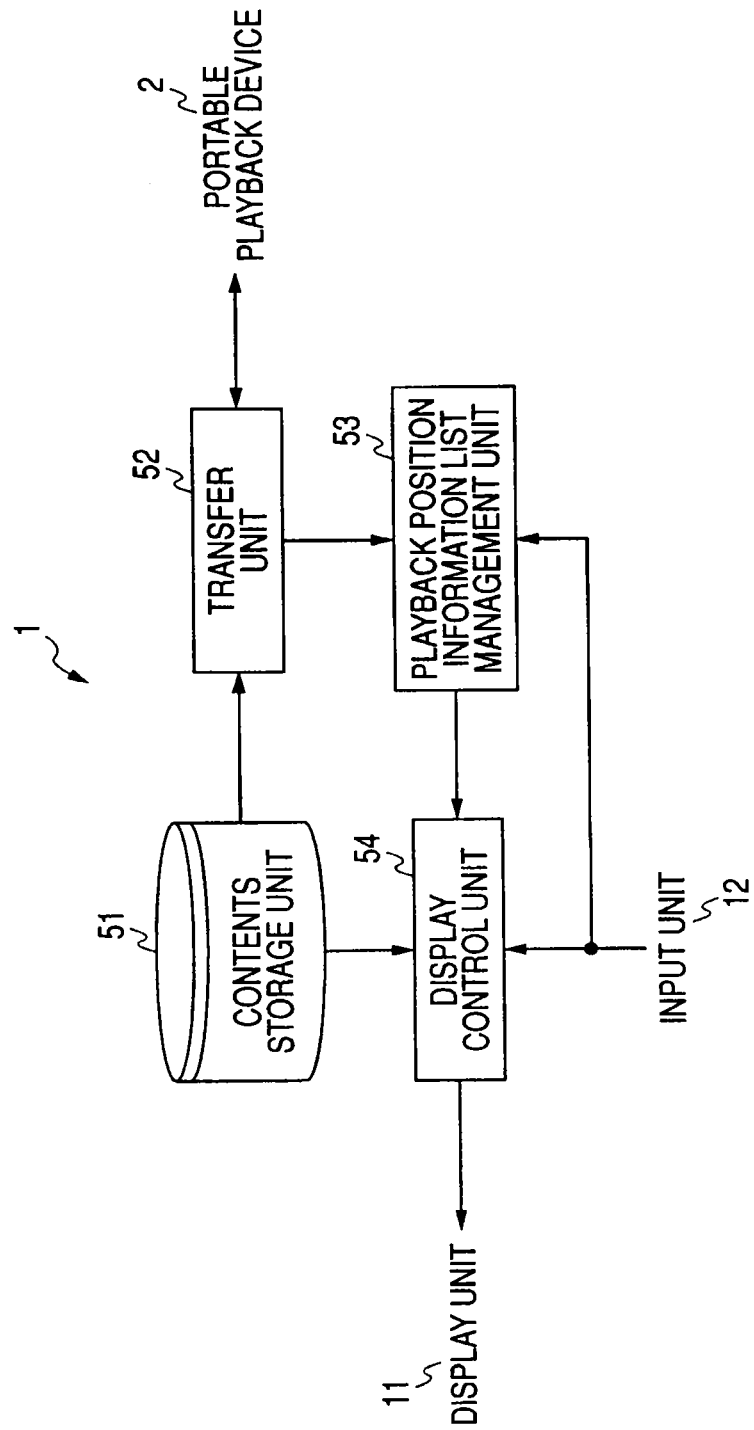
FIG. 4 is a block diagram showing a function configuration of a recording/playback device.

A recording/playback apparatus according to an embodiment of the invention includes an output unit (for example, a transfer unit 52 of FIG. 4) outputting a content to the playback terminal, a management unit (for example, a playback position information list management unit 53 of FIG. 4) managing a list in which plural information including position information indicating positions designated by a user of the playback terminal during playback of the content and identification information of the user of the playback terminal, which are outputted from the playback terminal, and a playback unit (for example, a display control unit 54 of FIG. 4) presenting specific information of the content at respective positions indicated by the position information included in information including the same identification information as identification information designated by the user among information registered in the list, and playing back the content from a selected position.

Figure 6:
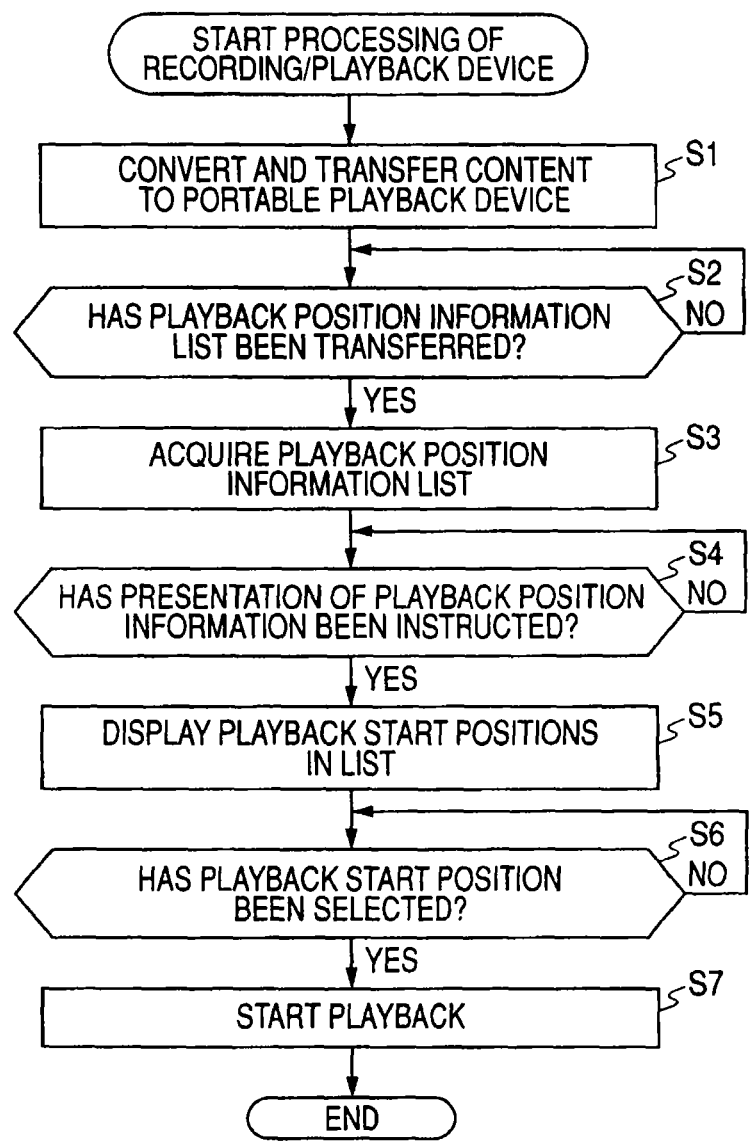
FIG. 6 is a flowchart explaining processing of the recording/playback device.

An information processing method or a program according to an embodiment of the invention includes the steps of outputting a content to a playback terminal, managing a list in which plural information including position information indicating positions designated by a user of the playback terminal during playback of the content and identification information of the user of the playback terminal, which are outputted from the playback terminal, and presenting specific information of the content at respective positions indicated by the position information included in information including the same identification information as identification information designated by the user among information registered in the list, and playing back the content from a selected position (for example, Step S7 of FIG. 6).

Figure 5:
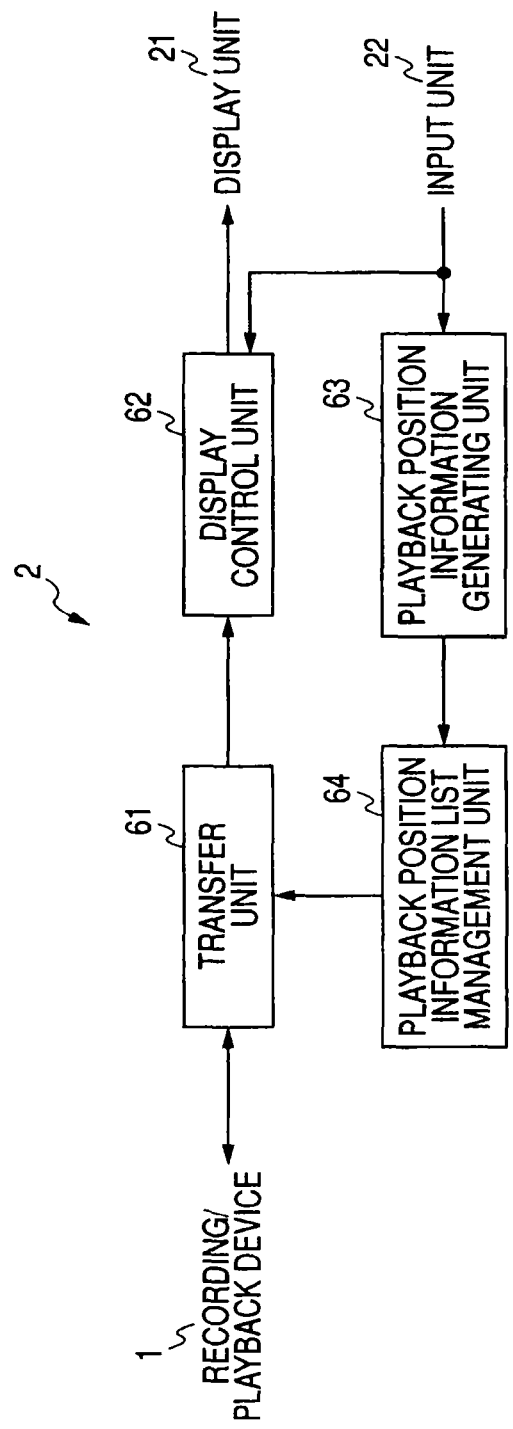
FIG. 5 is a block diagram showing a function configuration of a portable playback device.

A playback terminal according to an embodiment of the invention includes a playback unit (for example, a display control unit 62 of FIG. 5) playing back a content outputted from a recording/playback apparatus, a generating unit (for example, a playback position information generating unit 63 of FIG. 5) generating information including position information indicating positions in the content designated by the user during playback of the content and identification information of the user, and registering the information in the list, and an output unit (for example, a transfer unit 61 of FIG. 5) outputting the list in which plural information generated by the generating unit is registered to the recording/playback apparatus.

Figure 7:
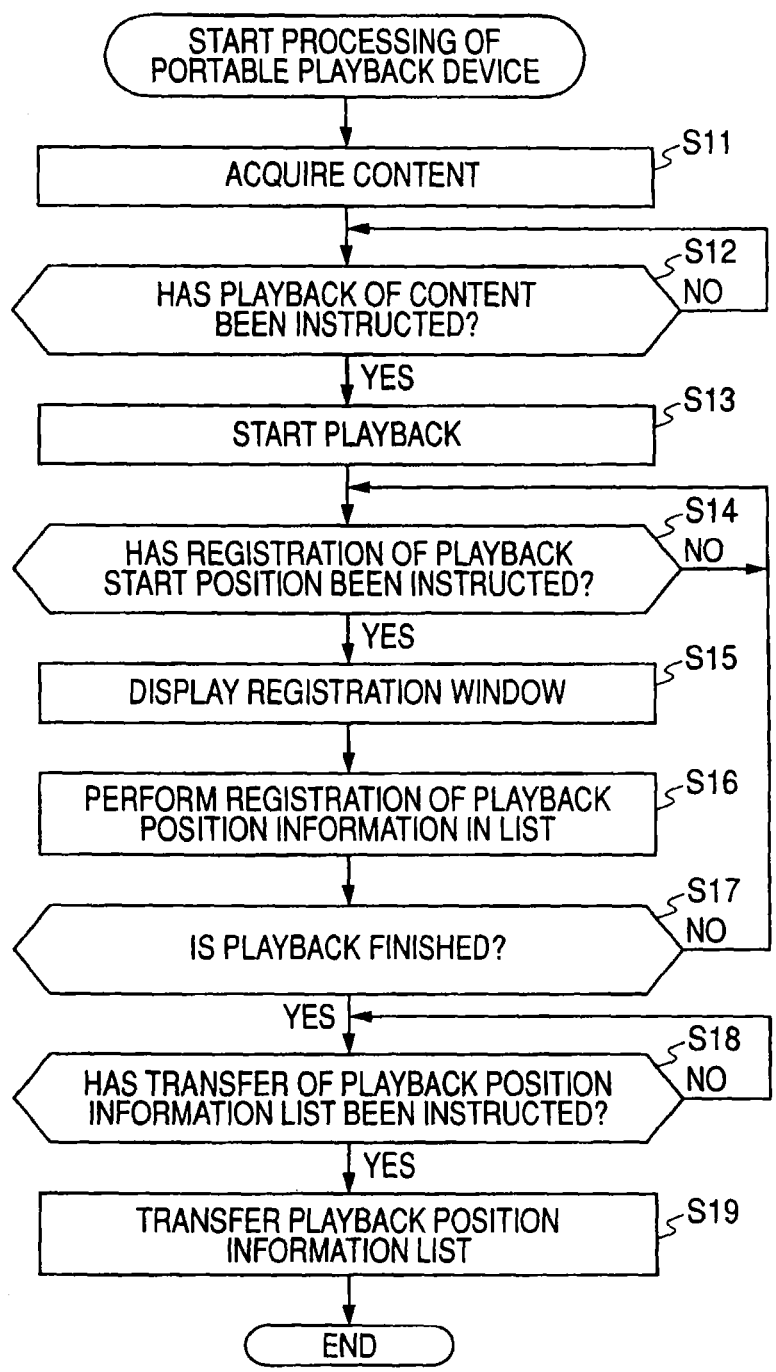
FIG. 7 is a flowchart explaining processing of the portable playback device.

An information processing method or a program according to an embodiment of the invention includes the steps of playing back a content outputted from a recording/playback apparatus, generating information including position information indicating positions of the content designated by the user during the playback of the content and identification information of the user, and registering the information in a list, and outputting the list in which the generated plural information is registered to the recording/playback apparatus (for example, Step S19 of FIG. 7).

Hereinafter, embodiments of the invention will be explained with reference to the drawings.

FIG. 1 is a view showing a configuration example of an information processing system according to an embodiment of the invention.

As shown in FIG. 1, the information processing system includes a recording/playback device 1 and a portable playback device 2.

The recording/playback device 1 is a hybrid recorder including, for example, an HDD drive and a DVD drive, which is placed at home. On the other hand, the portable playback device 2 is a terminal such as a cellular phone, which is held by the user.

The recording/playback device 1 and the portable playback device 2 can communicate with each other through wires or air. The communication between the recording/playback device 1 and the portable playback device 2 is also performed through a memory card respectively removable with respect to the recording/playback device 1 and the portable playback device 2.

In the information processing system including these devices, the user transfers a prerecorded content recorded in the recording/playback device 1 to the portable playback device 2 and can view the content by using the portable playback device 2. When the user is viewing the content by using the portable playback device 2, the user can also register positions such as favorite scenes in the portable playback device 2.

Information concerning positions registered in the portable playback device 2 is outputted from the portable playback device 2 to the recording/playback device 1 at a predetermined timing such as when the communication becomes available again, and respective positions are presented to the user by the recording/playback device 1. The user allows the recording/playback device 1 to start playing back of the same content as the content viewed by using the portable playback device 2 from the selected position by selecting a designated position from the positions to be presented. A television receiver including an LCD (Liquid Crystal Display) and the like is connected to the recording/playback device 1, and content video played back by the recording/playback device 1 is displayed on a screen of the television receiver.

The above function is used, for example, on an occasion when positions of favorite scenes at the time of viewing the content by using the portable playback device 2 are registered, and the same scenes are reviewed leisurely by using the recording/playback device 1 after coming home, or on an occasion when one scene of a program such as an English conversation program is viewed repeatedly by using the recording/playback device 1 or the portable playback device.

A sequence of processing flow performed between the recording/playback device 1 and the portable playback device 2 will be explained.

A plurality of prerecorded contents are recorded in the recording/playback device 1, and a content selected, for example, from a list of the prerecorded contents by the user is converted into a content having a format for the portable playback device 2 by lowering resolution or reducing the transfer rate as shown by an arrow A1.

The content whose format has been converted is copied to the portable playback device 2 by communication performed between the recording/playback device 1 and the portable playback device 2 by wires or air, or by a memory card in which the content is recorded by the recording/playback device 1 mounted on the portable playback device 2 and read out from the portable playback device 2, as shown by an arrow A2. The original content remains in the recording/playback device 1 and the content having lower quality than the original content, though the contents are the same as the original, is outputted to the portable playback device 2.

In the portable playback device 2, the content copied from the recording/playback device 1 is played back according to an instruction by the user as shown by an arrow A3, and video of the content is displayed at a display unit 21 provided in the portable playback device 2. The user can view the content which has been recorded in the recording/playback device 1 by using the portable playback device 2.

During viewing of the content, as described above, the user can register positions of the content by operating, for example, a button provided at the portable playback device 2. The operation by the user is received by an input unit 22 and playback position information is generated according to the input by the user.

Figure 2:
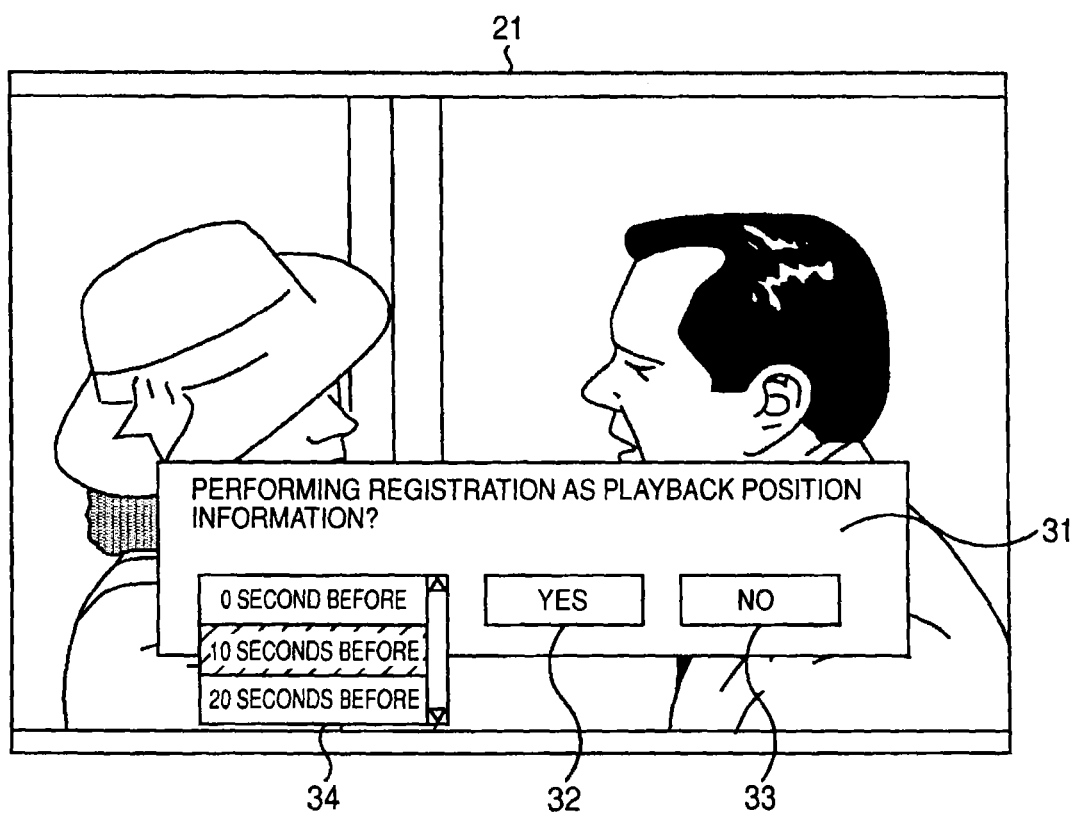
FIG. 2 is a view showing a display example of a registration window for a playback start position.

FIG. 2 is a view showing a display example of a registration window for a playback start position.

The window shown in FIG. 2 is displayed when the user instructs the position registration during viewing of the content.

When the user instructs the position registration, the playback of the content becomes a pause state, and a menu 31 is displayed as a UI (User Interface) used for the position registration, being superimposed on the content video as shown in FIG. 2.

In the menu 31, an "YES" button 32 selected when registering a position, a "NO" button 33 selected when position registration is stopped, and a selection menu 34 used for selecting a position to be registered as a position played back how many seconds prior to a current playback position when the user instructs the position registration are displayed.

In the example of FIG. 2, three items of "0 second before", "10 seconds before" and "20 seconds before" are displayed in the selection menu 34, and the user can register the position which is prior to the current playback position by the selected seconds from the selection menu 34 by selecting one item by pressing an up-and-down button provided at a surface of a casing of the portable playback device 2, and next, selecting the "YES" button 32.

When registering the position, the user can input designated character strings as a comment concerning the position which has been registered by the user. It is preferable that the input of character strings is performed by using the UI for inputting character strings such as a software keyboard, or also preferable to be performed by using alphabet keys physically provided at the portable playback device 2.

The position registration is performed by the user, using the UI described above.

Returning to the explanation for FIG. 1, when the input concerning the position by the user is received by the input unit 22, as shown by an arrow A4, playback position information concerning the position designated by the user is generated, and registered in a playback position information list stored in an internal nonvolatile memory. The communication of information between the recording/playback device 1 and the portable playback device 2 is performed through the memory card, the playback position information generated in accordance with the input by the user will be registered in the playback position information list stored in the memory card.

For example, an identification ID of the content during playback, an identification ID of the user and optional character strings inputted by the user are included in the playback position information, in addition to position information represented by time from the head of the content. That is, one position in the content is indicated by one playback position information. In the playback position information list can register plural playback position information. It is also preferable that playback position information of plural contents is allowed to be registered in one playback position information list. In the case that the identification ID is set in the portable playback device 2, for example, an identification ID of the portable playback device 2 is used as the identification ID of the user.

The registration of the playback position information is repeated every time position registration is instructed by the user and playback position information is generated, and the playback position information list obtained by the processing is copied to the recording/playback device 1 at a predetermined timing as shown by an arrow A5. The copy of the playback position information list is performed by, for example, the communication between the recording/playback device 1 and the portable playback device 2 by wires or air or by the recording/playback device 1 reading out the playback position information list recorded in the memory card by the portable playback device 2.

When the playback position information list is copied to the internal nonvolatile memory, only playback position information concerning the content selected as a playback target by the user from all playback position information registered in the playback position information list is selected in the recording/playback device 1. The selection of the playback position information is performed based on a result of matching between the identification ID of the content selected as the playback target and the identification ID of the content included in the playback position information.

Additionally, a thumbnail image is generated, which shows the contents at a position of the content indicated by the playback position information selected based on the identification ID of the content, and displayed at a display unit 11 by the recording/playback device 1 as shown by an arrow A6. In the case that the user registered plural positions in one content, thumbnail images showing the contents at respective positions are generated and displayed in a list. The display unit 11 is, for example, a component of the television receiver connected to the recording/playback device 1.

Figure 3:
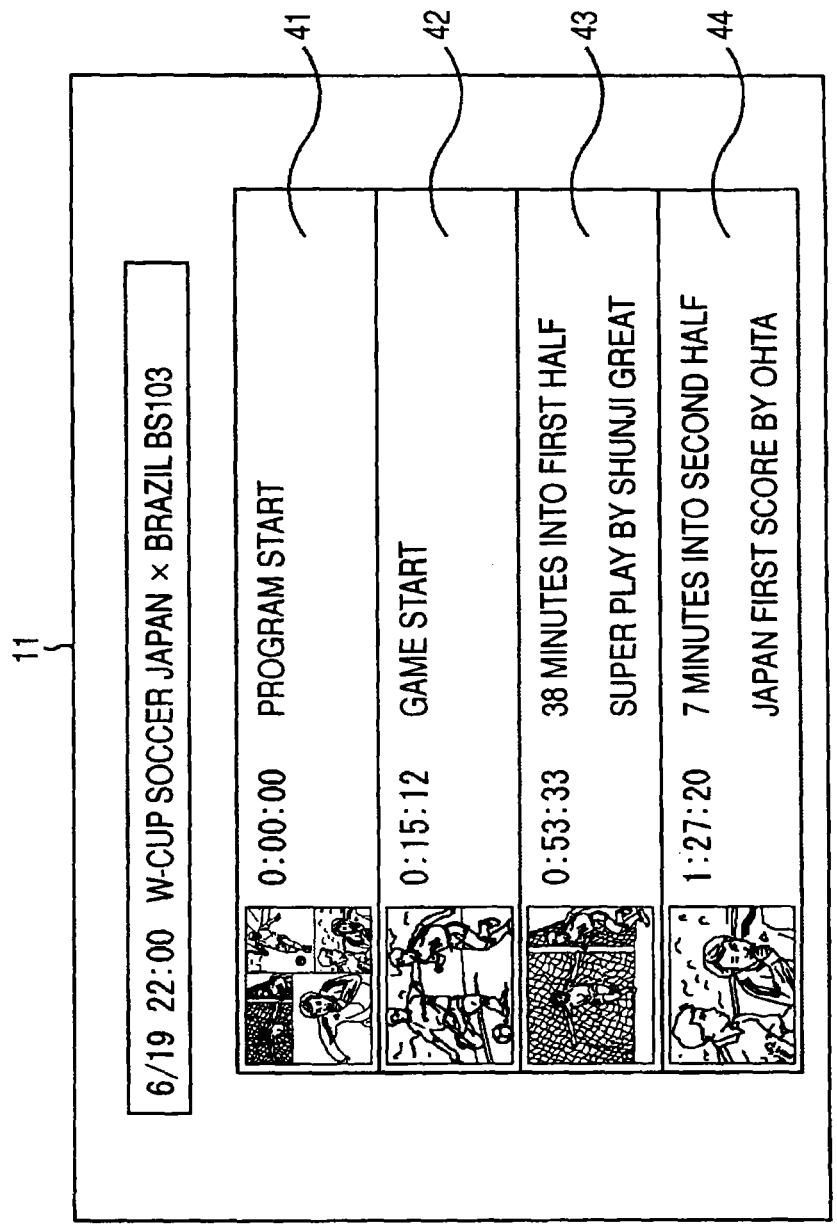
FIG. 3 is a view showing a display example of a selection window for a playback start position.

FIG. 3 is a view showing a display example of a selection window for a playback start position.

The window shown in FIG. 3 is displayed when the content of the playback target is selected and the display of the list of the playback start positions is instructed by the user, using, for example, a remote controller of the recording/playback device 1.

In the example of FIG. 3, information of four playback start positions is displayed at columns 41 to 44 in time series, respectively. The figure shows the example in which the user registered four positions when the user viewed a content of "W-Cup Soccer Japan×Brazil" a title of which is shown at an upper part of FIG. 3 by using the portable playback device 2.

Information displayed in the column 41 in FIG. 3 is information concerning a position specified by "0:00:00" in the content of "W-Cup Soccer Japan×Brazil".

An image displayed at the left end of the column 41 is a thumbnail image generated by the recording/playback device 1 based on the content video at the position specified by "0:00:00", and character strings "PROGRAM START" displayed at the right side of the display of "0:00:00" are a comment inputted when the user registered the position of "0:00:00" in the portable playback device 2.

Information displayed at the column 42 of FIG. 3 is information concerning a position specified by "0:15:12" in the content of "W-Cup Soccer Japan×Brazil".

An image displayed at the left end of the column 42 is a thumbnail image generated by the recording/playback device 1 based on the content video at the position specified by "0:15:12", and character strings "GAME START" displayed at the right side of the display of "0:15:12" are a comment inputted when the user registered the position of "0:15:12" in the portable playback device 2.

In the same manner, information displayed at the column 43 of FIG. 3 is information concerning a position specified by "0:53:33" in the content of "W-Cup Soccer Japan×Brazil", and information displayed at the column 44 is information concerning a position specified by "1:27:20" in the content of "W-Cup Soccer Japan×Brazil".

The user can select a playback start position at a certain column from the above window displayed by the recording/playback device 1 by operating the remote controller and the like and allows the playback of the content to start from the selected position.

For example, when the user selects the playback start position of the column 42 of FIG. 3, playback of the content "W-Cup Soccer Japan×Brazil" is started from the position specified by "0:15:12" in the recording/playback device 1.

The display of the window shown in FIG. 3 is performed based on playback position information including the same identification ID as the user's identification ID inputted by the user. In the case that plural users use the recording/playback device 1, respective users can display the list of playback start positions registered by them by instructing the display of the list of the playback start positions after respective users input their identification IDs.

Returning to the explanation of FIG. 1, the operation performed by the user with respect to the window shown in FIG. 3 are received by an input unit 12. When the operation of selecting the playback start position by the user is received by the input unit 12, the playback is started from a position selected by the user as shown by an arrow A7.

As described above, the user can select the position from which the playback is started by the recording/playback device 1 by referring the positions which have been registered when viewed by using the portable playback device 2. The user can easily search scenes and the like registered by the user because he/she wanted to view the scenes again when coming home.

Additionally, since comments in putted when positions have been registered are displayed at the list of playback start positions, the user can search the target scene more easily, as compared with the case in which thumbnail images and positions are merely displayed as information of respective positions.

The details of respective processing of the recording/playback device 1 and the portable playback device 2 performed according to the above flow will be described later with reference to flowcharts.

FIG. 4 is a block diagram showing a function configuration example of the recording/playback device 1. At least part of function units shown in FIG. 4 is realized by a prescribed program executed by a CPU included in the recording/playback device 1.

As shown in FIG. 4, in the recording/playback device 1, a contents storage unit 51, a transfer unit 52, a playback position information list management unit 53, and a display control unit 54 are realized.

The contents storage unit 51 stores prerecorded contents. The contents recorded in the contents storage unit 51 are read out by the transfer unit 52 when transferred to the portable playback device 2, and read out by the display control unit 54 when played back on the recording/playback device 1.

For example, when a content is selected from the list of prerecorded contents by the user, the transfer unit 52 reads out the selected content from the contents storage unit 51 and converts the read-out content into a content having a format for the portable playback device 2 to be transferred to the portable playback device 2.

The transfer unit 52 also acquires the playback position information list managed by the portable playback device 2 when the list is transferred from the portable playback device 2, and outputs the playback position information list to the playback position information list management unit 53.

The playback position information list management unit 53 manages the playback position information list transferred from the portable playback device 2 by storing the list in a nonvolatile memory and the like. The playback position information list management unit 53 is, for example, when a content of a playback target is selected by the user, performs matching between the identification ID of the selected content and identification IDs of contents included in respective playback position information registered in the managed playback position information list, and outputs only the playback position information having the matched identification ID to the display control unit 54.

There is a case in which, after a prerecorded content is transferred to the portable playback device 2, the original content is deleted from the contents storage unit 52, and playback position information of contents not stored in the contents storage unit 51 in the playback position information registered in the playback position information list may be abandoned by the playback position information list management unit 53.

When the content of the playback target is selected by the user, and the display of the position list registered with respect to the content by using the portable playback device 2 is instructed by the user, the display control unit 54 reads out data of the content at the position indicated by the playback position information supplied from the playback position information list management unit 53, generating a thumbnail image based on the read-out data. In the case that plural playback position information is supplied from the playback position information list management unit 53, thumbnail images showing the contents at positions indicated by respective playback position information are generated.

The display control unit 54 displays a window as shown in FIG. 3 at the display unit 11, in which thumbnail images, times indicating positions when registered are displayed with comments included in the playback position information, allowing the user to select a playback start position of the content.

When a certain position is selected from the displayed playback start positions by the user, the display control unit 54 reads out data of the content starting from the selected position from the contents storage unit 51, and plays back the read-out data, thereby displaying content video at the display unit 11 from the position selected by the user. Audio of the content is also outputted from a speaker and the like of the television receiver connected to the recording/playback device 1, which corresponds to the video display.

FIG. 5 is a block diagram showing a function configuration example of the portable playback device 2. At least part of function units shown in FIG. 5 is realized by a prescribed program executed by a CPU included in the portable playback device 2.

As shown in FIG. 5, in the portable playback device 2, a transfer unit 61, a display control unit 62, a playback position information generating unit 63 and a playback position information list management unit 64 are realized.

When the content having a prescribed format selected at the recording/playback device 1 is transferred from the recording/playback device 1, the transfer unit 61 acquires the content, and outputs the acquired content to the display control unit 62.

The transfer unit 61, when the transfer of the playback position information list to the recording/playback device 1 is instructed by the user, acquires the playback position information list managed by the playback position information list management unit 64, and outputs the playback position information list to the recording/playback device 1.

The display control unit 62 plays back the content supplied from the transfer unit 61 in accordance with instruction by the user, and displays content video at the display unit 21. The display control unit 62 also outputs audio of the content from a speaker, or earphones fitted to the portable playback device 2.

The display control unit 62 allows the playback of the content to be a pause state when registration of a position is instructed by the user during playback of the content, displaying the window shown in FIG. 2.

When the input by the user performed with respect to the window shown in FIG. 2 is received by the input unit 22, and information indicating the contents of the input by the user is supplied from the input unit 22, the playback position information generating unit 63 generates playback position information including information of a position indicated by a time from the head of the content, an indication ID of the content, an indication ID of the user and character strings inputted by the user, and outputs the generated playback position information to the playback position information list management unit 64. The playback position information generating unit 63 generates playback position information and outputs the generated playback position information to the playback position information list management unit 64 every time position registration is instructed by the user.

The playback position information management unit 64 registers the playback position information supplied from the playback position information generating unit 63 in the playback position information list. The playback position information list managed by the playback position information list management unit 64 is read out at a predetermined timing by the transfer unit 61 and transferred to the recording/playback device 1.

Subsequently, respective processing of the recording/layback device 1 and the portable playback device 2 having the above configurations will be explained.

First, processing of the recording/playback device 1 will be explained with reference to a flowchart in FIG. 6.

The processing is started when, for example, one content is selected from the list of prerecorded contents by the user.

In Step S1, the transfer unit 52 of the recording/playback device 1 reads out the content selected by the user from the contents storage unit 51, and converts the read-out content into a content having a format for the portable playback device 2 to be transferred to the portable playback device 2. In the portable playback device 2, the content is played back in accordance with an instruction by the user, and position registration is performed suitably.

In Step S2, the transfer unit 52 judges whether the playback position information list has been transferred from the portable playback device 2 or not, and waits until the transfer unit 52 judges that the list has been transferred.

When it is judged that the playback position information list has been transferred in Step S2, the transfer unit 52 proceeds to Step S3, acquiring the transferred playback position information list. The transfer unit 52 outputs the acquired playback position information list to the playback position information management unit 53 to allow the list to be managed.

In Step S4, the display control unit 54 judges whether presentation of positions has been instructed by the user or not, which have been registered when the content of the playback target was selected by the user and the same content was viewed by the user by using the portable playback device 2, and waits until the display control unit 54 judges the presentation has been instructed.

When the display control unit 54 judges that the presentation of positions registered when the user viewed the content by using the portable playback device 2 has been instructed in Step S4, the display control unit 54 proceeds to Step 5 and displays the registered playback start positions by a list as shown in FIG. 3 based on the playback position information supplied from the playback position information list management unit 53. When the content of the playback target was selected by the user, in the playback position information list management unit 53, playback position information concerning positions for the content of the playback target registered by the user is selected among playback position information registered in the playback position information list to be outputted to the display control unit 54.

In Step S6, the display control unit 54 judges whether a certain position has been selected from the presented playback start positions by the user or not, and waits until the display control unit 54 judges that the position has been selected.

When the display control unit 54 judges that the certain position has been selected in the Step S6, the display control unit 54 proceeds to Step S7, reads out data of the content starting from the selected position from the contents storage unit 51, and plays back the read-out data. Video of the played content is displayed at the display unit 11 and audio is outputted from the speaker.

Next, processing of the portable playback device 2 will be explained with reference to a flowchart of FIG. 7.

The processing is started when, for example, a content having a prescribed format is transferred from the recording/playback device 1.

In Step S11, the transfer unit 61 of the portable playback device 2 acquires the content transferred from the recording/playback device 1, and outputs the acquired content to the display control unit 62.

In Step S12, the display control unit 62 judges whether start of playback of the content has been instructed or not, and waits until the display control unit 62 judges that the start of playback has been instructed by the user.

When the display control unit 62 judges that the start of playback has been instructed by the user in Step S12, the display control unit 62 proceeds to Step S13, starting playback of the content, for example, from the head thereof. Video of the played content is displayed at the display unit 21 and audio is outputted from the speaker and the like.

In Step S14, the display control unit 62 judges whether registration of a playback start position has been instructed or not, and waits until the display control unit 62 judges that the registration has been instructed. The playback of the content is continued until the registration of the playback start position is instructed.

When the display control unit 62 judges that the registration of the playback start position has been instructed by the user in Step S14, the display control unit 62 proceeds to Step S15, allows the playback of the content to be a pause state and displays a window used for the position registration as shown in FIG. 2 at the display unit 21.

In Step S16, the playback position information generating unit 63 generates playback position information including information indicating a position designated by the user, an identification ID of the content, an identification ID set in the portable playback device 2 (user ID) and character strings inputted by the user, and outputs the generated playback position information to the playback position information list management unit 64 to be registered in the playback position information list.

In Step S17, the display control unit 62 judges whether the playback of the content is finished or not, and repeats the processing from Step S14 until the display control unit 62 judges the finish. When the display control unit 62 judges that the playback of the content is finished in Step S17, the process proceeds to Step S18.

In Step S18, the transfer unit 61 judges whether transfer of the playback position information list to the recording/playback device 1 has been instructed by the user or not, and waits until the transfer unit 61 judges that the transfer has been instructed.

When the transfer unit 61 judges that the transfer of the playback position information list to the recording/playback device 1 has been instructed by the user, the transfer unit 61 proceeds to Step S19, transfers the playback position information list managed by the playback position information list management unit 64 to the recording/playback device 1 and ends the processing.

According to the above processing, the user can select a position from which the playback is started in the recording/playback device 1 by referring to positions registered when viewed the content using the portable playback device 2.

In the above description, the case that the content which can be viewed by the user using the portable playback device 2 and in which playback start positions can be registered is the content copied from the recording/playback device 1 has been explained, however, it is also preferable that the user registers playback start positions with respect to contents played back on the portable playback device 2 by streaming.

In the above description, in the playback start position list displayed in the recording/playback device 1, only thumbnail images, positions (for example, time or chapter information) and character strings are displayed as information for respective playback start positions, however, it is also preferable that various scene metadata other than the above are displayed. For example, in the case that the priority of the playback start position can be set at the time of registration of the playback start position, the set priority is displayed at the list as the scene metadata.

It is also preferable that the identification ID of the user is displayed as scene metadata, and that, when the user registers his/her name in the portable playback device 2 and it is included in the playback position information, the name of the user is displayed as scene metadata.

The playback start positions registered by the user are not only used for selecting a start position of the playback in the recording/playback device 1 but also used for the skip (index) after the playback is started. In this case, playback is performed from respective playback start positions registered by the user every time the user instructs the skip by operating the remote controller and the like.

In the above description, playback position information registered in the playback position information list will be deleted in the recording/playback device 1 when the concerned content is deleted, however, it is preferable that the content is deleted when instructed by the user. Also in the portable playback device 2, the content may be deleted in accordance with the instruction of the user or the deletion of the content.

In the above description, the identification ID of the user included in the playback position information is the identification ID set in the portable playback device 2, however, it is also preferable that other identification IDs are used. For example, in the case that it is necessary that information of the portable playback device 2 is registered in the recording/playback device 1 as information of a device for viewing the content before transferring the content, an identification ID generated by the recording/playback device 1 at the time of the initial registration is used as the identification ID of the user. In this case, the same identification ID generated by the recording/playback device 1 is managed both in the recording/playback device 1 and the portable playback device 2, and the user using the portable playback device 2 is identified by the recording/playback device 1 based on the identification ID.

It is also preferable that an identification ID is added to the content when the content is copied to the portable playback device 2, and the added identification ID is used not only as the ID for identifying the content but also used as the ID for identifying the user.

The above series of processing can be executed by hardware as well as executed by software. In the case that the series of the processing is executed by the software, programs included in the software are installed from a program storage medium to a computer incorporated in a dedicated hardware or, for example, a general-purpose computer which can execute various functions by installing various programs.

Figure 8:
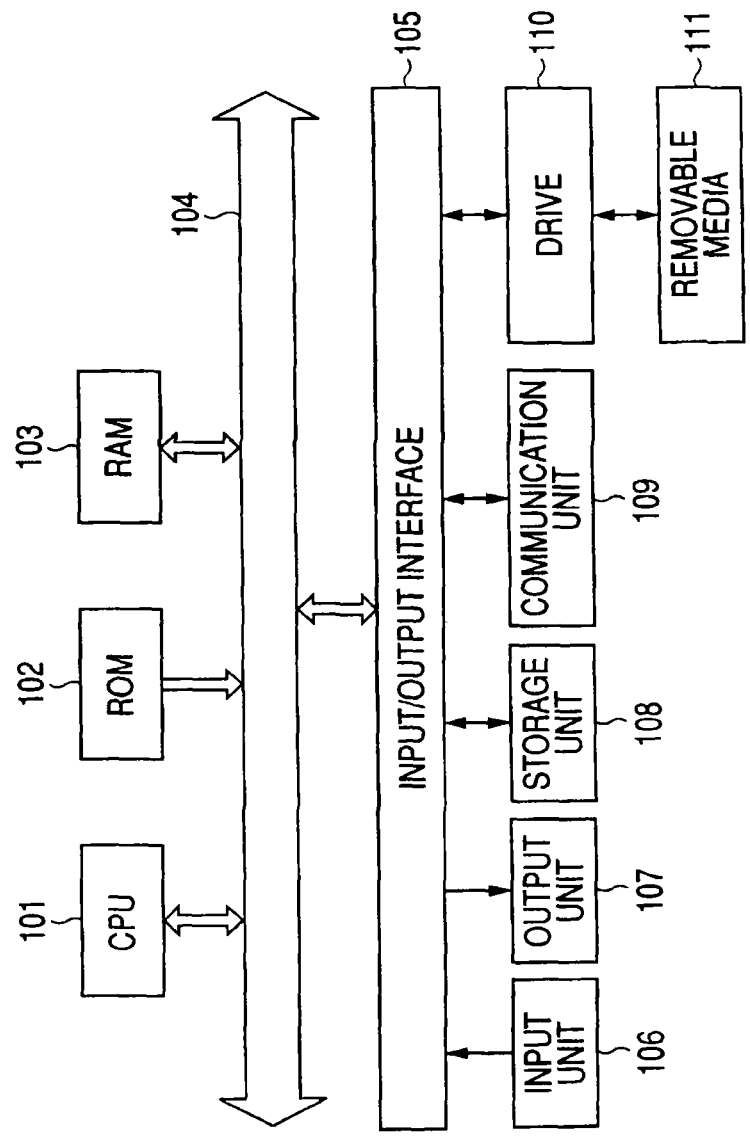
FIG. 8 is a block diagram showing a configuration example of a personal computer.

FIG. 8 is a block diagram showing an example of a configuration of a personal computer which executes the above series of processing by programs.

A CPU (Central Processing Unit) 101 executes various processing in accordance with programs stored in a ROM (Read Only Memory) 102, or a storage unit 108. In a RAM (Random Access Memory) 103, programs executed by the CPU 101 and data and the like are suitably stored. The CPU 101, the ROM 102 and the RAM 103 are connected to one another by a bus 104.

An input/output interface 105 is connected to the CPU 101 through the bus 104. To the input/output interface 105, an input unit 106 including a keyboard, a mouse, a microphone and the like and an output unit 107 including a display, a speaker and the like are connected. The CPU 101 executes various processing in accordance with instructions inputted from the input unit 106. Then, the CPU 101 outputs results of processing to the output unit 107.

The storage unit 108 connected to the input/output interface 105 includes, for example, a hard disc, which stores programs executed by the CPU 101 or various data. The communication unit 109 communicates with external apparatuses through networks such as Internet or local area networks.

A drive 110 connected to the input/output interface 105, when removal media 111 such as a magnetic disc, an optical disc, an optical magnetic disc or a semiconductor memory are mounted, drives them and acquires programs or data stored therein. The acquired programs or data are transferred to the storage unit 108 if necessary to be stored therein.

The program storage media installed in the computer and storing programs which are activated by the computer includes the removal media 111 as package media such as the magnetic disc (including a flexible disc), the optical disc (including a CD-ROM (Compact Disc-Read Only Memory), a DVD (Digital Versatile Disc), the optical magnetic disc, or the semiconductor memory and the like, the ROM 102 in which programs are stored temporally or permanently, and the hard disc included in the storage unit 108. The storage of programs to the program storage media is performed by utilizing wired or wireless communication media such as local area networks, Internet or digital satellite broadcasting through the communication unit 109 which is an interface such as a router or a modem, according to need.

In the specification, steps describing programs includes not only processes performed in time series along the described order but also includes processes not always processed in time series but executed in parallel or individually.

In the specification, the system means the whole apparatus including plural devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising:
a recording/playback apparatus; and
a playback terminal,
wherein the recording/playback apparatus includes circuitry configured to
output a content to the playback terminal,
manage a list received from the playback terminal, the list including position information designated at the playback terminal during playback of the content to identify content positions and identification information identifying a user of the playback terminal, the information identifying the user being set in the playback terminal by the user,
present specific information of the content at respective positions indicated by the position information and the identification information registered in the list, the circuitry playing back the content from a selected position, and
wherein the playback terminal includes circuitry configured to
play back the content outputted from the recording/playback apparatus,
generate the position information based on a current content position and a predetermined time offset and to register, in the list, the position information in association with the identification information of the user, and
output the list, in which a plurality of position information generated is registered, to the recording/playback apparatus,
wherein the predetermined time offset is selected from a scrollable menu that is overlaid on the content being played back in conjunction with an operation button, and the specific information of the content is presented at a position indicated by the position information in response to actuation of the operation button after selection of the predetermined time offset from the scrollable menu.

2. The information processing system according to claim 1, wherein the identification information of the playback terminal identifies the user.

3. The information processing system according to claim 1, wherein the identification information of the playback terminal is generated by the recording/playback apparatus and transmitted to the playback terminal.

4. The information processing system according to claim 3, wherein the playback terminal is registered in the recording/playback apparatus prior to output of the content to the playback terminal, the identification information being transmitted to the playback terminal after registration.

5. The information processing system according to claim 4, wherein the recording/playback apparatus inserts the identification information of the playback terminal into the content prior to outputting the content to the playback terminal.

6. A recording/playback apparatus, comprising:
circuitry configured to
output a content to a playback terminal;
manage a list received from the playback terminal and including position information indicating content positions designated at the playback terminal during playback of the content, based on a predetermined time offset, and identification information of a user of the playback terminal, the information identifying the user being set in the playback terminal by the user; and
present specific information of the content at respective positions indicated by the position information and the identification information registered in the list, the circuitry playing back the content from a selected position,
wherein the predetermined time offset is selected from a scrollable menu that is overlaid on the content being played back in conjunction with an operation button, and the specific information of the content is presented at a position indicated by the position information in response to actuation of the operation button after selection of the predetermined time offset from the scrollable menu.

7. The recording/playback apparatus according to claim 6, wherein the circuitry presents at least images of the content and time information at respective positions as the specific information.

8. The recording/playback apparatus according to claim 7, wherein, when user comments inputted in the playback terminal when designating positions of the content are included in the list, the circuitry further represents the comments as the specific information in addition to images of the content and time information at respective positions.

9. An information processing method, comprising:
outputting a content to a playback terminal;
managing a list received from the playback terminal, the list including position information indicating content positions designated at the playback terminal during playback of the content, based on a predetermined time offset, and identification information of a user of the playback terminal, the identification information of the user being set in the playback terminal by the user;
presenting specific information of the content at respective positions indicated by the position information and the identification information registered in the list; and
playing back the content from a selected position, wherein the predetermined time offset is selected from a scrollable menu that is overlaid on the content being played back in conjunction with an operation button, and the specific information of the content is presented at a position indicated by the position information in response to actuation of the operation button after selection of the predetermined time offset from the scrollable menu.

10. The information processing method according to claim 9, wherein, in the playback step, at least images of the content and time information at respective positions are presented as the specific information.

11. The information processing method according to claim 10, further comprising:
when user comments inputted in the playback terminal when designating positions of the content are included in the list, representing the comments as the specific information in addition to images of the content and time information at respective positions.

12. A non-transitory computer-readable medium storing computer-readable instructions thereon, the computer-readable instructions when executed by a processor cause the processor to perform a method comprising:
outputting a content to a playback terminal, managing a list received from the playback terminal, the list including position information indicating content positions based on a predetermined time offset selected at the terminal, and identification information of a user of the playback terminal, the identification information of the user being set in the playback terminal by the user;

presenting specific information of the content at respective positions indicated by the position information and the identification information registered in the list; and playing back the content from a selected position, the predetermined time offset is selected from a scrollable menu that is overlaid on the content being played back in conjunction with an operation button, and the specific information of the content is presented at a position indicated by the position information in response to actuation of the operation button after selection of the predetermined time offset from the scrollable menu.

13. A playback terminal, comprising:

circuitry configured to play back a content outputted from a recording/playback apparatus;

generate position information indicating positions in the content designated at the playback terminal during playback of the content, based on a predetermined time offset, and to register, in a list, the position information in association with identification information of a user of the playback terminal, the identification information of the user being set in the playback terminal by the user; and output the list, in which a plurality of position information generated is registered, to the recording/playback apparatus, wherein the predetermined time offset is selected from a scrollable menu that is overlaid on the content being played back in conjunction with an operation button, and specific information of the content is presented at a position indicated by the position information in response to actuation of the operation button after selection of the predetermined time offset from the scrollable menu.

14. The playback terminal according to claim 13, wherein the circuitry, when position registration is instructed during the playback of the content, presents a user interface including the predetermined time offsets for selection by the user, and generates the position information from a current position in the content and a selected predetermined time offset.

15. The playback terminal according to claim 13, wherein the circuitry generates user comments inputted when designating positions of the content.

16. The playback terminal according to claim 13, wherein the predetermined time offset includes one of 10 second before the current position of the content and 20 second before the current position of the content.

17. An information processing method comprising:

playing back a content outputted from a recording/playback apparatus;

generating position information indicating positions of the content designated at a playback terminal during the playback of the content, based on a predetermined time offset, and identification information of a user of the playback terminal, the identification information of the user being set in the playback terminal by the user;

registering the position information and the identification information in a list; and outputting the list, in which a plurality of position information is registered, to the recording/playback apparatus, wherein the predetermined time offset is selected from a scrollable menu that is overlaid on the content being played back in conjunction with an operation button, and specific information of the content is presented at a position indicated by the position information in response to actuation of the operation button after selection of the predetermined time offset from the scrollable menu.

18. The information processing method according to claim 17 further comprising:

when position registration is instructed during the playback of the content, presenting a user interface including the predetermined time offsets for selection by the user; and generating the position information based on a current position in the content and a selected predetermined time offset.

19. The information processing method according to claim 17 further comprising:

generating information including comments inputted by the user when designating positions of the content.

20. A non-transitory computer-readable medium storing computer-readable instructions thereon, the computer readable instructions, when executed by a processor cause the processor to perform a method comprising:

playing back a content outputted from a recording/playback apparatus;

generating position information indicating positions of the content designated at a playback terminal during the playback of the content, based on a predetermined time offset, and identification information of a user of the playback terminal, the identification information of the user being set in the playback terminal by the user;

registering the position information and the identification information in a list; and outputting the list, in which a plurality of position information is registered, to the recording/playback apparatus, wherein the predetermined time offset is selected from a scrollable menu that is overlaid on the content being played back in conjunction with an operation button, and specific information of the content is presented at a position indicated by the position information in response to actuation of the operation button after selection of the predetermined time offset from the scrollable menu.

* * * * *